United States Patent Office 3,523,871
Patented Aug. 11, 1970

3,523,871
STABILIZATION OF CATALASE
Yoshitaka Matsuoka and Mizuo Yajima, Tokyo, Japan, assignors to Eisai Co., Ltd., Bunkyo-ku, Tokyo, Japan, a corporation of Japan
No Drawing. Filed July 13, 1967, Ser. No. 653,041
Claims priority, application Japan, July 20, 1966, 41/47,045; Feb. 7, 1967, 42/7,451
Int. Cl. C07g 7/02
U.S. Cl. 195—63    3 Claims

ABSTRACT OF THE DISCLOSURE

A method of stabilizing catalase in which a polysaccharide which is soluble or dispersible in water is added to a catalase-containing solution or a crystalline catalase suspension, the amount of the polysaccharide added from 0.5 to 10.0 times by weight of the weight of the catalase, and then freeze-drying or spray-drying the solution or suspension, and the product of said method.

FIELD OF THE INVENTION

The present invention relates to the stabilization of catalase and more particularly to stable and less hygroscopic dried catalase and methods of making the same. According to the present invention, the loss of the catalase activity will be prevented during the freeze-drying or the spray-drying of a catalase-containing solution or a crystalline catalase suspension, and also after long standing of the freeze-dried or spray-dried catalase.

DESCRIPTION OF THE PRIOR ART

Generally, in drying an aqueous solution of an enzyme, freeze-drying (lyophilization) is carried out in order to obtain a stable dried enzyme without causing any great denaturation or inactivation in most cases. But some enzymes will remarkably lose activity as a result of the freeze-drying.

Catalase is a typical example of enzymes which will be partially denatured and inactivated during freeze-drying. For example, when an aqueous suspension of crystalline beef liver catalase is freeze-dried, the activity of the catalase will be reduced to less than ⅓ its former value. When this freeze-dried catalase is left standing, it will be further denatured to be quite insoluble within a relatively short period. (See pages 21 to 23 of "Science" vol. 97, 1943 by A. L. Dounce and J. W. Howland.)

The catalase which will be thus inactivated by the freeze-drying process will be naturally seen to be remarkably inactivated by spray-drying which will be carried out under more severe conditions than freeze-drying.

It is therefore an object of the present invention to provide a less hygroscopic dried catalase which maintains high activity and is stabilized against the loss of activity in storage.

Another object of the present invention is to provide a new and improved method for obtaining less hygroscopic dried catalase by freeze-drying or by spray-drying without losing substantially the catalase activity.

SUMMARY OF THE INVENTION

We have studied the stabilizing effects of various substances with a view to producing stable and less hygroscopic freeze-dried (lyophilized) catalase or spray-dried catalase and we have discovered that polysaccharides soluble or dispersible in water are effective to prevent the inactivation of catalase due to dehydration and to stabilize dried powdery catalase.

The method of the present invention is carried out by freeze-drying or spray-drying a catalase-containing solution or a crystalline catalase suspension after adding thereto a polysaccharide soluble or dispersible in water. This results in the production of a less hygroscopic dried catalase which is stabilized by said polysaccharide against the loss of activity.

As is well known, catalase is an enzyme widely distributed in nature and it can be obtained in crystalline condition from various mammalian livers, kidneys, and erythrocytes and bacteria. Its main sources for extraction are livers, kidneys, and blood of beef, hogs and sheep. There are known various methods for preparing crystalline catalase from such starting materials as above described. (Refer to "Methods in Enzymology," ed., by S. P. Colowick and N. O. Kaplan, vol. II, pp. 775–788, Academic Press Inc., New York, 1955.)

Crystalline catalase is insoluble in water at its isoelectric point and it will form a suspension when added to water. However, it will be dissolved in water when the pH of the solution is adjusted to the alkaline side. For example, liver catalase will not dissolve in distilled water but it will form a suspension when added to distilled water, since its isoelectric point is 5.7. However, if the pH of said suspension is adjusted to 7–8 by adding an alkali, the catalase crystals will dissolve in water.

The method of the present invention can be used for the stabilization of all kinds of catalase regardless of their origin.

Further, it can be used for obtaining dried catalase powder not only from aqueous solutions or suspensions of purified catalase, but also from semi-purified catalase preparations, for example, aqueous solutions of catalase-containing precipitate, prepared according to the method described in U.S. Pat. No. 2,703,779.

The polysaccharides which are used as the stabilizers in the present invention include chondroitin sulfates, such as chondroitin sulfate sodium and chondroitin sulfate potassium, heteropolysaccharides from seeds of Leguminosae species and soluble starch. Among them, chondroitin sulfates and heteropolysaccharides from seeds of Leguminosae species are preferred for the purpose of the present invention since they show particularly marked stabilizing effects.

Such polysaccharides are added to catalase in a amount of about 0.5 to 10.0 times, preferably 1.0 to 5.0 times, by weight of the catalase.

The freeze-drying or spray-drying of the catalase-containing solution or the crystalline catalase suspension, to which a polysaccharide has been added as a stabilizer, can be carried out by known conventional processes, using a suitable conventional freeze-drier or spray-drier.

In the case of the spray-drying, the inlet temperature should be less than 180° C., preferably 120 to 160° C.

In the prior art, as stabilizers to be used in freeze-drying catalase it is known to use disaccharides, such as sucrose, lactose and maltose (U.S. Pat. No. 3,133,001), hexitols, such as mannitol and sorbitol (Belgian Pat. No. 657,602) and glycine, sodium chloride and sodium citrate (Canadian Pat. No. 673,735). Among these stabilizers, disaccharides, such as sucrose and lactose, show a considerable stabilizing effect but their greatest defect is that the resulting product is so hygroscopic that it will become pasty during storage by absorbing moisture from the atmosphere. This will not only reduce the commercial value of such a product, but also the product will be dificult to make into pharmaceutical preparations, such as tablets and powders.

The dried catalase containing a polysaccharide as a stabilizer according to the present invention is characterized by its high stability and its low hygroscopicity. For example, we observed that the products according to the present invention did not show substantially any tendency to become pasty and to reduce the catalase activity after standing for two months at room temperature.

DESCRIPTION OF PREFERRED EMBODIMENTS

Examples of the present invention are shown in the following.

Control

Crystalline catalase (twice crystallized) extracted from a fresh beef liver according to the method of J. B. Sumner and A. L. Dounce (on page 417 of "The Journal of Biological Chemistry" vol. 121, 1937) was dissolved in water at pH 7 to provide a 2% solution of catalase (which will be referred to hereinafter as "catalase standard solution").

The catalase standard solution was freeze-dried without adding any stabilizer thereto as a control. The residual catalase activity of the resulting dried powder was 23% of what it was before drying.

The catalase activity was measured by iodometry using hydrogen peroxide as a substrate (by H. Lueck on page 888 of "Methods of Enzymatic Analysis," 1963, edited by Hans Ulrich Bergmeyer, translated by D. H. Williamson and published by Academic Press, New York and London). The catalase activity of the catalase standard solution before the drying was 33,000 Kat.f. (Katalase-faehigkeit).

Example 1

4 g. of chondroitin sulfate sodium were added and dissolved in 200 ml. of the catalase standard solution. When the solution was freeze-dried, the residual catalase activity of the resulting dried powder was 96%.

Example 2

8 g. of Glyoid 3A [trade name of a heteropolysaccharide from seeds of *Tamarindus indicia* L. (Leguminosae) produced by Dai Nippon Pharmaceutical Company, Ltd., Japan] were gradually added and completely dispersed in 200 ml. of the catalase standard solution. When the dispersion was then freeze-dried, the residual catalase activity of the dried powder was 95%.

Example 3

About 2 g. (equivalent to 1 g. as a dry weight) of the crystalline catalase prepared as described in the "Control" were suspended in 10 ml. of water and the suspension was mixed with 90 ml. of 10% starch solution. When the crystalline catalase suspension was then freeze-dried, the residual catalase activity of the resulting dried powder was 90%.

When the crystalline catalase suspension was freeze-dried without adding any stabilizer, the residual catalase activity was 32%.

Example 4

The same crystalline catalase prepared as described in the foregoing "Control" was dissolved in water at pH 7 to provide a 1.0% aqueous solution of catalase. 10 g. of Glyloid 3A were added and well dispersed in 1,000 ml. of this aqueous catalase solution. When the dispersion was spray-dried at an inlet temperature of 150 to 160° C. and an outlet temperature of 80 to 90° C., 14 g. of a powder were obtained. The residual catalase activity of this powder was 93% of the catalase activity before the drying.

Example 5

10 g. (by dry weight) of the same crystalline catalase prepared as described in the "Control" was suspended in 1,000 ml. of water. 20 g. of chondroitin sulfate sodium were added and dissolved in this catalase suspension. When the suspension was then spray-dried at an inlet temperature of 140 to 150° C. and an outlet temperature of 70 to 80° C., 22 g. of a powder were obtained. The residual catalase activity of this powder was 96%.

The embodiments of the invention in which an exclusive property or privilege is claimed are defined as follows:

1. A process for preparing stable dried catalase comprising the steps of adding a polysaccharide selected from the group consisting of chondroitin sulfates, heteropolysaccharides from seeds of Leguminosae species and soluble starches to a catalase-containing solution or a crystalline catalase suspension and freeze-drying or spray-drying said solution or suspension.

2. A process for preparing dried catalase as claimed in claim 1, wherein the amount of said polysaccharide is 0.5 to 10.0 times by weight of the weight of the catalase.

3. A stable dried catalase composition which is comprised of catalase and a polysaccharide selected from the group consisting of chondroitin sulfates, heteropolysaccharides from seeds of Leguminosae species and soluble starches, the polysaccharide being present in an amount of 0.5 to 10.0 times by weight of the weight of the catalase said stable dried catalase prepared according to the process of claim 1.

References Cited

UNITED STATES PATENTS

| | | | |
|---|---|---|---|
| 2,908,614 | 10/1959 | Muggleton et al. | 195—66 X |
| 3,133,001 | 5/1964 | Muset | 195—68 |
| 3,193,393 | 7/1965 | Scott | 195—63 X |
| 3,413,198 | 11/1968 | Deutsch | 195—63 X |

LIONEL M. SHAPIRO, Primary Examiner

U.S. Cl. X.R.

195—68